United States Patent
Paykin

(10) Patent No.: US 6,322,082 B1
(45) Date of Patent: Nov. 27, 2001

(54) HIGH PRESSURE SEAL WITH CONTOURED STAMPING I. D.

(75) Inventor: Alex Paykin, Buffalo Grove, IL (US)

(73) Assignee: SKF USA Inc., Elgin, IL (US)

( * ) Notice: Subject to any disclaimer, the term of this patent is extended or adjusted under 35 U.S.C. 154(b) by 0 days.

(21) Appl. No.: 09/528,873

(22) Filed: Mar. 20, 2000

(51) Int. Cl.$^7$ .............................. F16J 15/32; B21D 53/84
(52) U.S. Cl. ..................... 277/549; 277/560; 277/562; 29/888.3
(58) Field of Search ..................... 277/309, 549, 277/551, 552, 553, 556, 559, 560, 562, 563, 564, 567, 572, 575, 924; 29/527.1, 530, 888.3

(56) References Cited

U.S. PATENT DOCUMENTS

| | | |
|---|---|---|
| 2,365,774 | 12/1944 | Pool . |
| 2,736,584 | 2/1956 | Riesing . |
| 2,797,944 * | 7/1957 | Riesing . |
| 2,836,450 * | 5/1958 | Rgiesing . |
| 2,867,457 | 1/1959 | Riesing et al. . |
| 3,455,564 | 7/1969 | Dega . |
| 4,102,538 | 7/1978 | Bertin . |
| 4,300,778 | 11/1981 | Gagne . |
| 4,311,316 | 1/1982 | Cather, Jr. . |
| 4,427,206 * | 1/1984 | Sugiyama . |
| 4,526,384 | 7/1985 | Riley, Jr. et al. . |
| 4,613,143 | 9/1986 | Butler . |
| 4,747,605 * | 5/1988 | Antonini . |
| 5,143,382 | 9/1992 | Maringer . |
| 5,326,112 | 7/1994 | Paykin . |
| 5,348,314 * | 9/1994 | Antonini . |
| 5,431,872 * | 7/1995 | Sink . |
| 5,915,696 | 6/1999 | Onuma et al. . |

* cited by examiner

Primary Examiner—Lynne H. Browne
Assistant Examiner—Vishal Patel
(74) Attorney, Agent, or Firm—Vedder Price Kaufman & Kammholz

(57) ABSTRACT

A fluid seal for installation in a high pressure environment. The seal casing comprises a casing member with an axial flange and a radial flange. The seal includes a rubber lip body and a flex neck section forming a pocket in which a synthetic resinous anti-extrusion insert is trapped. A radial flange of the casing includes on its innermost axial surface a plurality of shallow, spaced apart re-entrant formations, and the anti-extrusion insert in use overlying and covering at least the re-entrant portion of a face of the radial flange.

14 Claims, 1 Drawing Sheet

HIGH PRESSURE SEAL WITH CONTOURED STAMPING I. D.

BACKGROUND OF THE INVENTION

The present invention relates generally to oil seals, and in particular, to the manufacture of a one-piece oil seal that includes a principal lip and an auxiliary, opposite-facing lip, and also includes a separate nylon or like, anti-extrusion insert.

Particularly in the field of power steering seals, namely, those which act in cooperation with highly pressurized mechanisms including a steering rack, it is essential to obtain the best performance at lowest cost. Many years ago, it was discovered that the use of a bonded rubber oil seal could be backed up with an insert, preferably a nylon insert, to withstand the relatively high pressures found in power steering mechanisms at the time. Thus, with such seals undergoing sliding motion or both rotary and sliding motion, there was the strong possibility that dirt or other contaminations would enter and be moved along the steering rack, eventually scoring the rack or the seal and leading to leakage.

However, at that time, the oil seal was fitted with one or more separately formed back-up components, including those which contained auxiliary lips, all of which served to exclude contaminants from under the lip seal.

Because the cost of the seal is almost low in respect to the cost of labor to replace it, it is most important that seals provide a great deal of reliability when installed. Consequently, a number of designs have been selected and used, including those shown in U.S. Pat. No. 5,456,475. In this seal, the nylon insert is formed as a part of the back-up ring and the entire unit is much larger than necessary. It in turn is then backed up by a still further separately formed auxiliary or dirt lip with its own casing and rubber mounting diameter. In this design, therefore, the nylon back-up ring is somewhat reluctant to "float" and hence, to follow the shaft as closely as might be desired, although it is extrusion-proof.

Another approach has been to offset the inner part of the radial flange of the casing, thereby imparting a stepped appearance to it. With this configuration, the rubber can flow into the cavity thus formed, and surround the insert and thus add stability to the seal. However, such seals are capable of still further improvement, particularly those which are exposed to very high pressures and the possibility of allowing contaminants to enter them from the air side of the seal.

In view of the need for a further improved seal of the foregoing type for use in high pressure applications, it is an object of the present invention to provide an improved high pressure resistant seal.

Another object of the invention is to provide a method which makes it possible to use a more flexible type of nylon insert than has been previously indicated.

Yet another object of the invention is to provide a seal which can be made economically and with virtually the same cost as prior art seals yet provide improved performance in use.

Still another object of the invention is to provide a composite seal which is easy to manufacture and which will provide a high degree of reliability and use.

A further object of the invention is to provide a seal which may be optionally used with a simply formed seal providing a bonded dirt lip as well as an extra dirt lip, if necessary.

A still further object of the invention is to provide a seal which will resist high pressures in the application, and which includes plural ribs on the air side of the sealing lip and an integral dirt lip bonded to the casing.

An additional object of the invention is to provide a dirt lip containing a contoured inner diameter on the casing or stamping of the seal.

A still further object of the invention is to provide a seal with a stamping which can lie close to the shaft being sealed without unduly compromising the bonding of the seal dirt lip to the casing.

A further object of the invention is to provide a novel method of making a seal according to the invention.

A still further object of the invention is to provide a method wherein the rubber forming the bond between itself and the casing may flow readily into the necessary areas.

SUMMARY OF THE INVENTION

The present invention achieves these objects and others which are inherent in the invention by providing an L-shaped casing or cup, a rubber seal body component including frustoconical air and oil side surfaces meeting along a path of intended contact with the shaft, a garter spring groove and garter spring therein, a nylon insert between the shaft and the flex section of the seal, and a dirt lip formed on the opposite side of the casing, the dirt lip being bonded to the casing along an inside diameter which is contoured so as to provide various reliefs, scallops or slight pockets therein which can be filled with bonding rubber to provide increased retention thereof. The invention also provides a method of making the improved seal.

The manner in which these and other objects of the present invention are achieved in practice will become more clearly apparent when reference is made to the following detailed description of the invention and shown in the accompanying drawings wherein like reference numbers indicate corresponding parts throughout.

DESCRIPTION OF THE PREFERRED EMBODIMENTS OF THE INVENTION

Although the present invention may be practiced in several different forms, a description thereof will be made of a presently preferred form of seal made according to the invention.

Figure 1:
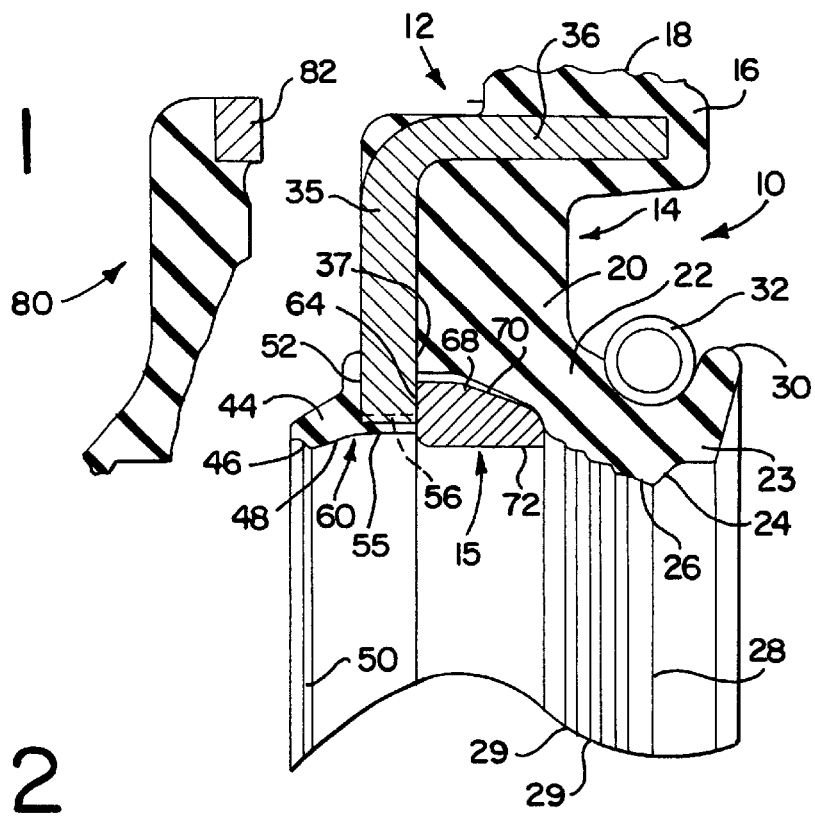
FIG. 1 is a vertical sectional view of the seal of the invention.
Figure 2:
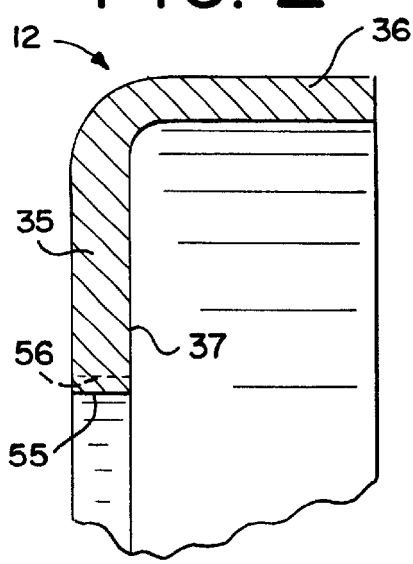
FIG. 2 is a vertical sectional view of the seal casing.

Referring now to FIG. 1, the seal generally designated 10 is shown to include a casing generally designated 12, a rubber portion generally designated 14 and a nylon or like synthetic resinous insert generally designated 15. The rubber portion 14 in this case includes an outside diameter covering or band of rubber 16 with occasional raised ribs 18 forming the outermost diameter of the band 16. The remainder of the rubber portion 14 includes a bonding portion 20 and further includes a flex section 22 lying between the bonding portion 20 and the sealing lip body 23.

The seal lip body also includes oil and air side frustoconical surfaces 24, 26 meeting along a seal band 28 of intended contact with a shaft (not shown) adapted to undergo rotation, reciprocating movement, or both. The air side frustoconical surface 26 includes a plurality of ribs 29 of gradually increasing diameter which, under the influence of pressure applied generally but especially through the flex section 22, engage the shaft with gradually decreasing degrees of tightness.

In addition, there is a spring groove 30 formed in the seal upper surface and retaining a garter spring 32. In the direction of the air side of the seal assembly is a radial flange 35 of the casing 12. The inner surface 37 of the flange 35 is securely bonded to the seal body 20 through most of the extent of the inner surface 37. The body 20 is also bonded to the mounting flange 36, which lies under the o.d. band of rubber 16. The rubber 16 and its ribs 18, define the seal outer diameter ("o.d.").

Referring now further to the seal 10, it very importantly includes a dirt or excluder lip 44 of rubber and having outside and inside surfaces 46, 48 meeting along the auxiliary seal band 50 of intended contact with the shaft.

In addition to the radial principal bonding surface 37 joining the dirt lip 44 to the radially innermost portion of the radial flange 35, is a radial auxiliary lip bonding surface 52 and, very importantly, an axial surface generally designated 54 to which the secondary lip is also bonded. This bonded axial surface actually has two diameters, 55 and 56. This is because of the scalloped or contoured inner diameter of the casing 12. This casing 12 (FIG. 3) includes a main or principal diameter 55 but also includes several notches, scallops, or reliefs 56 which during the dirt lip forming process, enhance the flow of rubber inside them, i.e., along the surfaces 56. Thus, the bonding portion of the rubber is irregular, the radial extent having a thickness which throughout most of the seal is relatively small, but with periodic large or thicker sections 56 to afford significantly greater strength and provide the features which make the seal novel.

The other main component of the seal is a nylon back-up ring 15 having a generally five sided surface in the preferred embodiment. This high pressure seal insert, generally designated 15, prevents extrusion of the rubber lip beneath the outer casing 12, and particularly under the innermost portion 55 of the radial flange of the casing 12. The insert 15 includes a rear radial surface 64 which is snugly engaged against the inwardly facing surface 37 on the inside of the seal casing radial flange 35. The contoured upper or outside diameter portion 68 of the insert 15 fits within the pocket 70 formed on the inside of the seal 10. The innermost surface 72 of the insert 62 lies very closely adjacent or upon the shaft and is forced there against by high pressure acting generally on the seal body 20, acting particularly on the flex section 22.

An optional feature of the seal is disclosed in FIG. 1. This shows a still further dirt lip generally designated 80, which is bonded to an auxiliary casing 82 or the like and adapted to be secured in closely adjacent relation to the seal shown in the remainder FIG. 1. This seal is strictly optional and may be placed in the environment to afford a backup or safety feature when the seal is to be used in an extremely dirty or dusty environment.

Referring now to the manufacture of the present seal, the same may be manufactured by a generally conventional technique as regards the primary lip of the seal. In this case, the pocket 70 is occupied by a part of the mold during manufacture.

Figure 3:
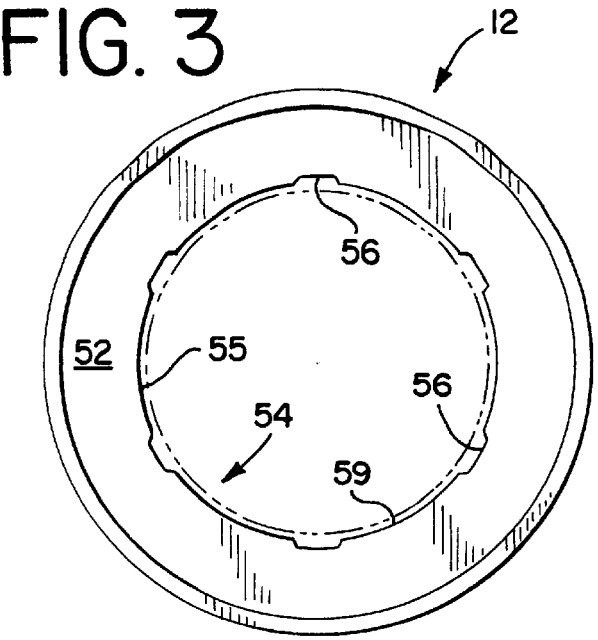
FIG. 3 is an end view, taken on a reduced scale, and showing the reliefs or scallops on the inside diameter of the seal casing.

When it comes to manufacturing the auxiliary lip 37, this may be accomplished by placing a charge or "prep" of rubber in the mold adjacent the portion where the lip is to be formed. The lip is thereupon molded into the shape shown in FIG. 1. In this process, the rubber flows up the radially inner portion of the outside of the radial flange 52 and along the axial surface generally designated 54, lying between the axial extent of the radial flange and the outer surface 59 of the mold. In this process, the rubber importantly flows also into the recessed surfaces or pockets 56. The space where this bonding occurs is also shown in FIG. 3, wherein the dotted line shows the area between the outer mold surface 59 and the edge 55 of the principal diameter. This web of rubber 60 is from about 0.007 inches in thickness to about 0.025 inches in thickness, and preferably 0.010 inches in thickness. The rubber thus is bonded to a surface area which greatly enhances its grip on the casing 12, but also allows the necessary support for the nylon insert 15. The advantage of this construction is that it allows working with higher pressures—up to perhaps 2,000 psi—with little or no extrusion of the nylon material. Moreover, a less expensive, more flexible nylon insert material may be used as a result of better containment or support.

In the preferred form, the pockets 56 are spaced 60° apart, viewed from the ends, and thus there are 6 such pockets. Each is typically about ⅛ inch wide (circumferentially) and each has a depth of 0.010 (0.020 on diameters). The radii are also 0.010.

It is thought that the reasons for the success of the invention involve a compromise, yet one which is unusual. If the web of rubber bonding the secondary lip to the casing were to be made thicker, then the nylon insert 15 would be extruded under the casing. If the bonding were very thin, it would lack the requisite strength. By having the bond in effect formed on two diameters, it has the necessary strength but its thin profile enables the casing to approach the shaft as closely as tolerances will permit.

It will thus be seen that the present invention provides an improved high pressure seal having a number of advantages and characteristics including those expressly point out here, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. A fluid seal for installation in a high pressure environment, said fluid seal comprising, in combination, a casing member comprising an axial flange having a radially inner surface and a radial flange having a given axial thickness and a radially innermost portion, a primary rubber lip element including a portion for bonding to said radially inner surface of said axial flange and to one face of said radial flange, a lip body portion and a flex neck section joining said lip body portion to said bonding portion, said lip body portion including air and oil side frustoconical surfaces meeting along a path of intended contact with an associated shaft, a pocket portion lying axially between said lip body portion and said radial flange, a synthetic resinous anti-extrusion insert in said pocket portion and a secondary lip bonded to said radially innermost portion of the other face of said radial flange and also having a web bonded to the axial thickness surface of said radial flange, said radial flange of said casing including on its innermost axial surface a plurality of shallow, spaced apart re-entrant formations, and said anti Application/Control extrusion insert in use overlying and covering at least the re-entrant formations of one face of said radial flange.

2. A fluid seal as defined in claim 1, wherein said web beneath the radially innermost portion of said radial flange is from about 0.005 inches to about 0.020 inches in thickness.

3. A fluid seal as defined in claim 1, wherein said web beneath said radially innermost portion of said radial flange is about 0.007 inches in thickness.

4. A fluid seal as defined in claim 1, wherein said lip body portion further includes a plurality of formations on the air side of the lip body portion, said formations being of gradually increasing diameter toward the air side of the fluid seal.

5. A fluid seal as defined in claim 1, wherein said lip body portion includes a garter spring groove and a garter spring therein for maintaining a radial load on said lip body portion.

6. A fluid seal as defined in claim 1, wherein said insert is made from a flexible nylon material.

7. A fluid seal as defined in claim 1, wherein said insert includes an axial surface which is substantially flat, a radial surface which abuts the radial flange of said casing and at least an inclined surface which extends axially and somewhat radially inwardly as it extends toward said primary rubber lip element.

8. A fluid seal as defined in claim 1, in which said re-entrant formations are spaced circumferentially apart approximately 60 degrees.

9. A fluid seal as defined in claim 1, in which said re-entrant formations are approximately ⅛ inch wide, measured circumferentially.

10. A fluid seal as defined in claim 1, wherein said re-entrant formations have a depth of from about 0.007 inches to about 0.020 inches.

11. A fluid seal as defined in claim 1, wherein said re-entrant formations each has a depth of about 0.010 inches.

12. A method of making a fluid seal for installation in a high pressure environment, said method comprising, forming a casing member with an axial flange and a radial flange having a radially innermost portion, surrounding the casing with seal-forming mold surfaces, bonding a primary rubber lip element to said flanges by forming a lip body portion and a flex neck section joining said lip body portion to said primary rubber lip element, said lip body portion including air and oil side frustoconical surfaces meeting along a path of intended contact with an associated shaft, forming a pocket in said fluid seal for accommodation of a synthetic resinous anti-extrusion insert, forming a secondary seal lip by flowing a charge of rubber along a portion of an axial outer surface of said radial flange and also along a narrow space between one of said mold surfaces and an axial surface on said radially innermost portion of said radial flange, said innermost axial surface including a plurality of radially extending shallow, spaced apart reentrant formations in said radial flange, thereby securing an improved bond between said secondary lip and said casing.

13. A method as defined in claim 12, wherein said narrow space between one of said mold surfaces and the axial surface on the radially innermost portion of said radial flange is from about 0.005 inches to about 0.020 inches in thickness.

14. A method as defined in claim 12, wherein said narrow space between one of said mold surfaces and the axial surface on the radially innermost portion of said radial flange is about 0.007 inches.

\* \* \* \* \*

UNITED STATES PATENT AND TRADEMARK OFFICE
CERTIFICATE OF CORRECTION

PATENT NO.      : 6,322,082 B1
DATED           : November 27, 2001
INVENTOR(S)     : Paykin It is certified that error appears in the above-identified patent and that said Letters Patent is hereby corrected as shown below:

<u>Column 4,</u>
Line 61, delete "Application/Control"

Signed and Sealed this

Eighteenth Day of March, 2003

JAMES E. ROGAN
*Director of the United States Patent and Trademark Office*